Feb. 23, 1954 G. ELLIOTT 2,670,406

TELECOMMUNICATION SYSTEM

Filed Dec. 26, 1951

3 Sheets-Sheet 1

INVENTOR.
GEORGE ELLIOTT
BY T. L. Bowes
ATTORNEY

INVENTOR.
GEORGE ELLIOTT
BY
T. L. Bowes
ATTORNEY

Feb. 23, 1954 G. ELLIOTT 2,670,406

TELECOMMUNICATION SYSTEM

Filed Dec. 26, 1951 3 Sheets-Sheet 3

INVENTOR.
GEORGE ELLIOTT
BY T. L. Bowes
ATTORNEY

Patented Feb. 23, 1954 2,670,406

UNITED STATES PATENT OFFICE 2,670,406

TELECOMMUNICATION SYSTEM

George Elliott, Rochester, N. Y., assignor to Stromberg-Carlson Company, a corporation of New York Application December 26, 1951, Serial No. 263,375

5 Claims. (Cl. 179—18)

This invention relates to telecommunication systems and particularly to signaling arrangements in machine switching telephone systems.

The object of the invention is to promote economy and the speed and reliability of the operation of the switching facilities, particularly those placed in an office such as a private dial office normally unattended by maintenance personnel.

The invention is embodied in the circuit arrangements of a step by step switch known as a selector-connector, that is a switch used both for extending connections to single lines through directed movements in each of two directions and to an idle one of a plurality of other lines through a directed movement in a first direction and an automatic movement in a second direction.

By the use of such a selector-connector a compact and reliable private dial office may be provided with means whereby the subscribers thereto may operate this switch to extend local connections therethrough to other local subscribers' stations or to lines leading to a central office. An attendant's cabinet is provided whereby calls incoming from the central office may be answered and extended to any one of the local subscribers and whereby general supervision over the system may be exercised.

A feature of the invention is a restricted service provision whereby access to any outgoing central office trunk may be denied to a particular local substation. This restricted service provision is of a flexible nature in that the service over only a particular group of outgoing central office trunks may be denied and service over others allowed. Thus, if there are central office outgoing trunks on two or more levels the service from a particular substation may be denied over one or the other or all of the said levels.

A feature of the invention thus resides in a double marking means whereby service over an outgoing trunk may be restricted in response to a marking of the particular line and the marking of a particular group of outgoing lines. If such marking is absent in either case the connection may be established. Thus a line marked for restricted service may be prevented from establishing outgoing calls only over trunks also marked as inaccessible to such restricted service lines. A restricted service line may freely make calls over outgoing trunks not so marked and all other substation lines not marked for restricted service may freely make calls over outgoing trunks marked for restricted service.

A feature of the invention is thus a selective arrangement for restricted service whereby subscribers' stations marked for restricted service may be selectively denied service over the trunks of a plurality of groups of outgoing trunks.

In accordance with the present invention the switch has a plurality of means whereby any one or more levels thereof may be marked for particular purposes. Thus one marking may be used to indicate that the outgoing lines of a level lead to a central office and that the switch on that level should act as a selector while on other levels not so marked it should operate as a connector. Stated otherwise, there is a means for marking a level in a first manner to differentiate the manner of the selection of the lines in that level from the manner of selection of the lines in levels not so marked. Another marking may be used to prevent access to any one of the lines of a level by a subscriber line marked for restricted service. Usually this second marking is applied only to levels containing central office trunks and therefore to levels having also the first type of marking, but it is to be noted that the invention does not require such double marking. Should it be desired, certain lines may be denied access to a group of other lines by the use of this second marking.

A feature of the invention is thus a plurality of marking arrangements for marking different levels of a switch either singly or in combination. Thus, the switch after being directed to a given level may thereafter be operated either as a selector or a connector. Again within given levels containing either lines of one or another nature such as trunk lines to a central office or single and individual subscribers' lines may be rendered inaccessible to other subscriber lines individually marked for restricted service. The present invention provides means whereby access to the lines of the executives of a company may be denied to lines serving certain of the maintenance and service personnel.

Another feature of the invention is the double use of certain relays under varying conditions. Specifically a relay conventionally known as a busy test relay and whose function has been to test for and detect the busy or idle condition of a called line is now additionally caused to function as an interrupter relay, a function heretofore assigned to another and separate relay. The busy test relay in the present arrangement not only acts as a test means to prevent the actual connection to a busy line but now also acts to keep the switch moving in its automatic search for an idle one out of a plurality of equivalent lines. By the use of the present arrangement a conventional relay may be entirely eliminated together with the wiring and the contact arrangements provided on other relays therefor.

A feature of the invention may therefore be stated as the provision in a switching device serving two or more classes of outgoing connections of a test relay responding in one manner to the busy or idle condition of the lines of one class and in another manner to the busy or idle condition of the lines of another class, performing a simple test function in the first instance and a double or test and operating function in another case.

Another feature of the invention is another double use of a conventional relay. Heretofore a so-called ringing trip relay has been used in each connector circuit for the purpose of detecting the answer of the called party and for thereupon disconnecting the ringing current and otherwise placing the circuit in condition for conversation. In the present case when a call is established over an outgoing trunk to the central office it is not necessary to transmit ringing current and therefore the services of the ringing trip relay are not required. However, this relay will immediately respond to the trunk level marking, the condition which differentiates the level as one leading to trunks rather than as one leading to subscriber lines, and will thereupon convert the switch from a connector to a selector. The ringing trip relay, now, instead of standing by to operate upon the answer of the called subscriber in the conventional manner will immediately operate and lock and in its operated condition will prepare for operation a different one of the cut through relays whereby a purely metallic circuit through the switch will be established when an idle trunk has been seized. One of the functions of this relay in the present arrangement is to control the ground to the common supervisory circuit including the enabling of the generator and certain tone sources.

A feature of the invention may therefore be stated as the provision of a relay for performing divers functions under divers modes of operation of the switch, performing a conventional operation when the switch is operating as a connector and another and unrelated operation when the switch is operating as a selector.

Other features will appear hereinafter.

The drawings consist of three sheets having five figures as follows.

Figures 1, 2, 3:
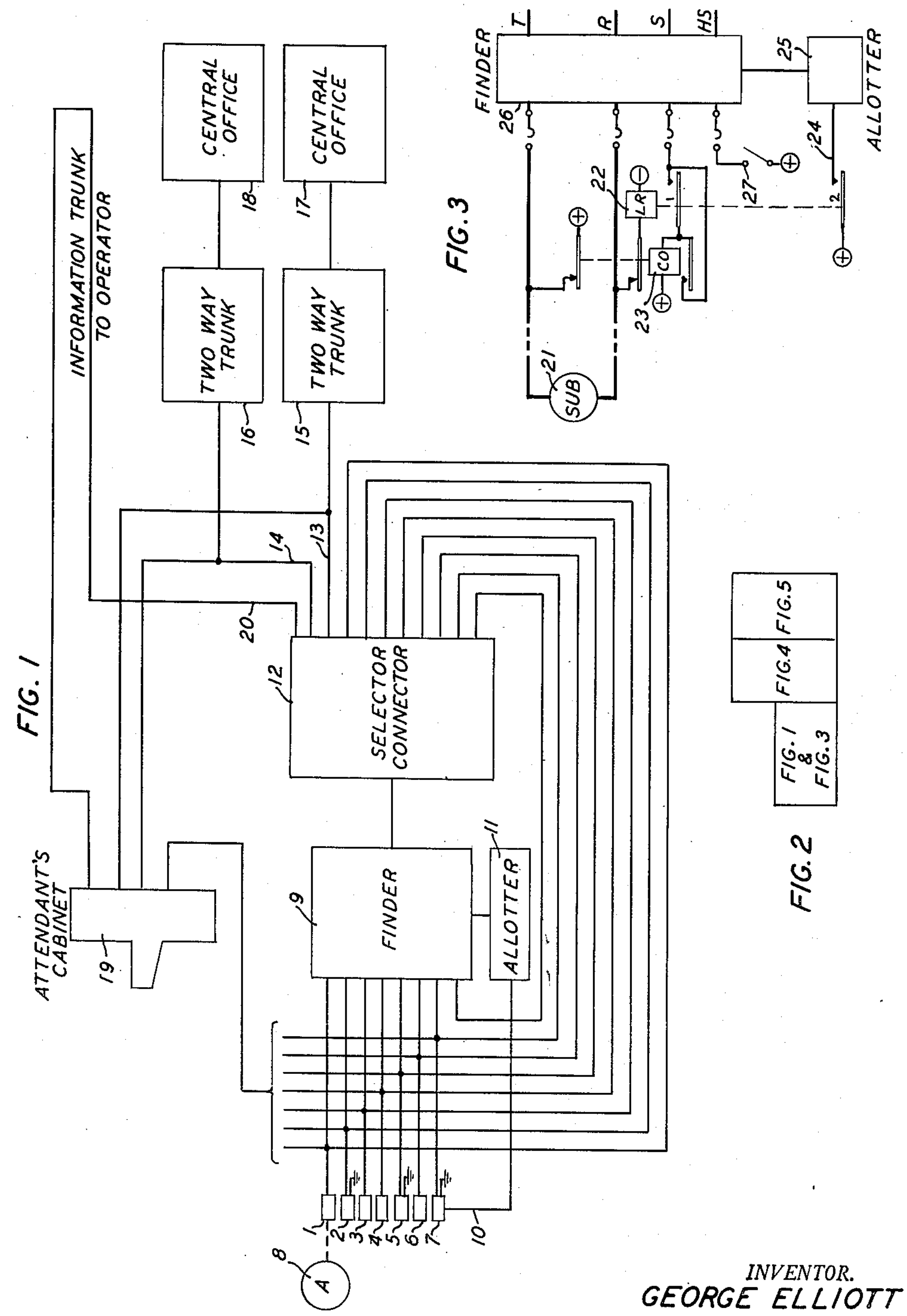
Fig. 1 is a schematic diagram showing the organization of a private dial office having selector-connectors for extending the lines of the subscribers therein, both the subscribers' lines and the trunk lines leading to central offices and an attendant's cabinet for answering incoming calls and otherwise serving the system.
Fig. 2 is a block diagram showing how the three sheets of drawings may be placed to form a complete circuit diagram of the selecting arrangement of the present invention.
Fig. 3 is a schematic showing of a subscribers' substation, the line circuit serving this subscribers' line, a finder switch and the allotter circuit therefor.

In Fig. 1 there are indicated a plurality of line circuits 1 to 7 inclusive, the first of which is shown connected to a subscribers' station 8, it being understood that the others are also so connected. The line circuits 2, 5 and 7 are indicated as having a ground connection made thereto which will appear hereinafter to be a means for marking the particular lines served by these line circuits for restricted service. Each of the lines may be picked up and served by a finder switch 9, a common lead 10 being indicated as extending through the line circuits to an allotter 11 for selecting for use and for putting into operation a finder such as the finder 9. Each of these lines is also shown as emerging from a selector-connector 12 coupled to the finder 9, thus when a substation such as 8 makes a call the starter wire 10 entering the allotter 11 will cause the finder 9 to pick up the incoming calling line and connect the selector-connector 12 thereto. The subscriber A at substation 8 may thereafter dial either two digits to select another one of these local subscribers' lines or may dial a single digit to select a trunk line to a central office. In the drawing two such trunk lines 13 and 14 are shown each passing through a two-way trunk line circuit 15 and 16 respectively and extending therefrom to a central office 17 and 18 respectively. These two trunk lines may be in the same switch level or for purposes of the present invention may represent the trunk lines of two different levels.

An attendant's cabinet 19 is provided for the purpose of answering incoming calls from the central office and for extending such calls to the lines of the subscribers in this private dial office or otherwise to attend to the business of the exchange. Lastly, a special trunk 20 accessible to the selector-connector is shown and marked as an information trunk to the operator.

*Detailed description*

Figure 4:
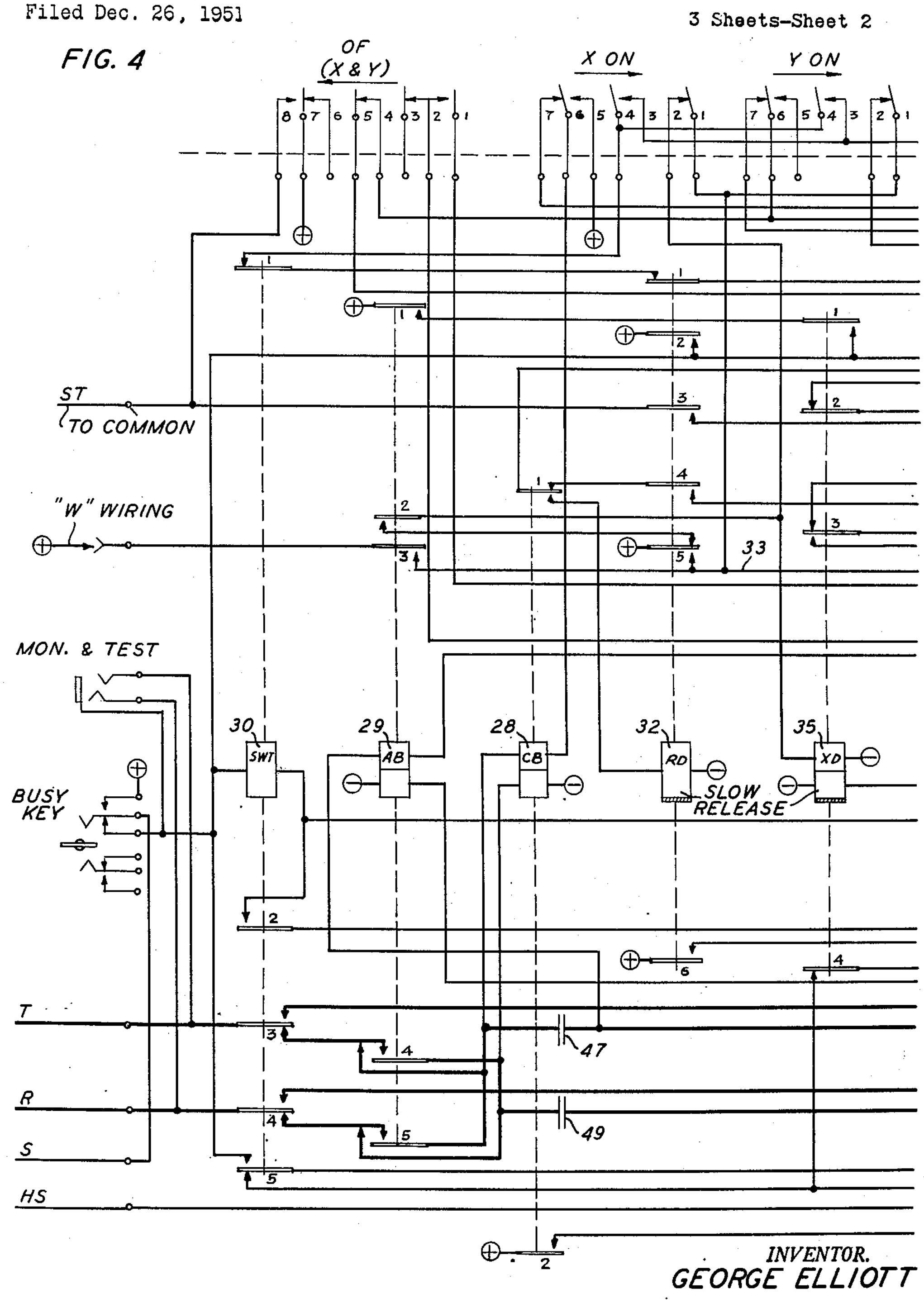
Figs. 4 and 5 together give a complete circuit diagram of the selector-connector switch of the present invention.
Figure 5:
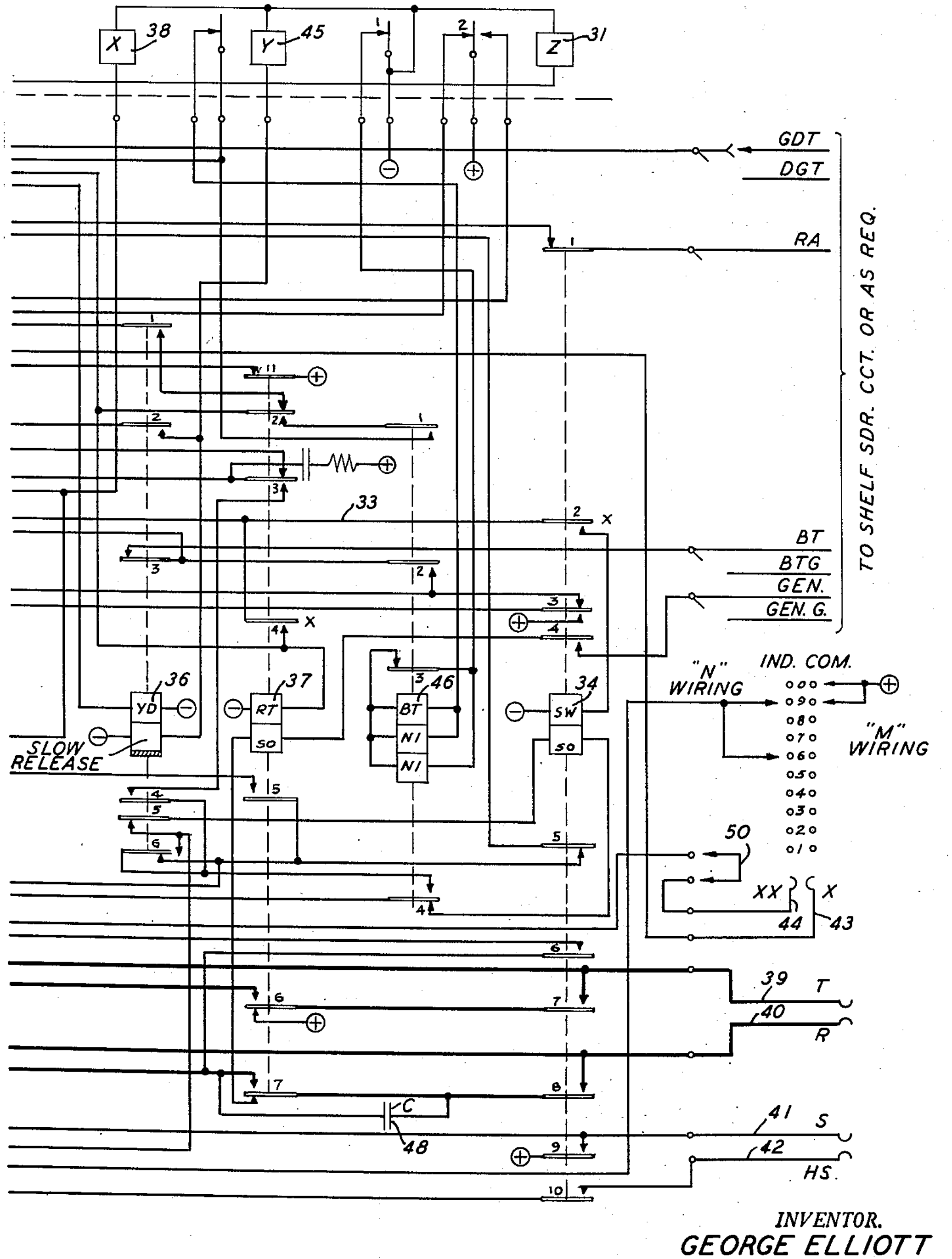

The system shown in Figs. 3, 4 and 5 placed as indicated in Fig. 2 may be used for a complete understanding of the operation of the selector-connector. The outgoing terminals of this switch are not shown, since these terminals and their arrangement in coordinate rows is well known and understood. The switch has four incoming terminals and four outgoing terminals known respectively as T, R, S and HS. The switch also has two outgoing wipers X and XX which move only in the first or group selecting direction and these wipers move over a bank of terminals corresponding to the various levels of the switch.

Within the switch circuit the battery connections are shown as a minus and a plus, each within a small circle or enclosed in parentheses. It is understood that the plus terminal of the battery is grounded so that hereinafter when a circuit is traced from battery to ground it will be understood that it is traced from the minus terminal to the plus terminal thereof.

In Fig. 3 a substation 21 is shown connected by dotted lines over its line to its line circuit. This line circuit consists essentially of a line relay 22 and a cut off relay 23 so that when the subscriber at station 21 makes a call the line relay 22 will be energized. This relay, through its armature 2 and front contact, will ground the starter wire 24 leading to the allotter 25 which will enable the finder 26 so that the calling line is picked up thereby. In a conventional manner the calling line will be found and the selector-connector associated with the finder 26 and, as shown in Figs. 4 and 5, will be seized. Upon the seizure of this selector-connector a ground will be returned over the sleeve lead through the front contact and armature 1 of the line relay 22 to operate the cut off relay 23 which thereupon locks into the ground on the sleeve and cuts off the line relay from the calling subscriber's line.

Within the line circuit in Fig. 3 a terminal 27 is shown with an indication below of a ground connection. This ground connection may be made to the terminal 27 so that this particular line will be marked for restricted service. If the terminal 27 is not grounded within the line circuit of Fig. 3, then the subscriber on that line will have free access to all lines served by the selector-connector of Figs. 4 and 5. The terminal 27 constitutes a means whereby the individual line may be marked for restricted service.

*Seizure of selector-connector.*

When this circuit is seized the loop over the tip and ring leads is closed through to the CB (calling bridge) relay 28. The circuit may be traced from battery through the lower winding of the CB relay 28, the normal contacts of armature 5 of the AB relay 29, the back contact and armature 4 of the SWT relay 30, ring of the line and thence over the circuit through the finder to the calling substation 21 back over the tip of the line, armature 3 and back contact of the SWT relay 30, normal contacts of armature 4 of the AB relay 29, the upper winding of the CB relay 28, springs 6 and 7 of the X off normal contact set to a ground in the shelf supervisory circuit, here indicated as the lead GDT (ground-dial tone). If a dial tone is not required then a common ground connection may be made in the shelf supervisory circuit in place of the grounded dial tone connection indicated.

The CB relay responds to this circuit and through its armature 1 and front contact extends a ground through the armature 2 and back contact of the Z (release) magnet 31 to the winding of the RD (release delay) slow release relay 32 and thence to battery. The RD relay responds and through its armature 5 and front contact places a ground on the master ground wire 33 for the purposes which will appear hereinafter. Through its armature 2 and front contact the RD relay grounds the sleeve wire leading back through the finder to the line circuit whereby the cut off relay therein is operated. Through its armature 6 and front contact the RD relay extends a ground to the lower winding of the SW (switch through) slow operating relay 34 to prepare this relay for operation. Ground placed on the master ground lead 33 is extended over contacts 1 and 2 of the X off normal set to the upper winding of the XD (X delay) slow releasing relay 35 whereby this relay is operated. Likewise the ground on the master ground lead 33 is extended over contacts 1 and 2 of the Y off normal set to the upper winding of the YD (Y delay) slow releasing relay 36, whereby this relay becomes operated. The three delay relays, the RD relay, the XD relay 35 and the YD relay 36 are thereupon operated for the purpose of controlling the switch in its response to the dial pulses from the calling substation 21.

*Dialing first digit.*

When the first digit is dialed the loop to the CB relay 28 is alternately opened and closed a number of times corresponding to the digit dialed. The CB relay 28 follows dial pulses each time the loop is opened. During each of these pulses the CB relay therefore restores and opens the circuit for the RD relay for a short interval during which, however, this relay due to its slow releasing characteristics, does not respond. The ground supplied for the operation of the RD relay is therefore switched over armature 1 and back contact of the CB relay 28, armature 4 and front contact of the RD relay 32, back contact and armature 3 of the RT relay 37, armature 3 and front contact of the XD relay 35 and thence over a circuit having two branches, one of which extends through the lower winding of the XD relay 35 to battery and the other of which extends through the winding of the X magnet 38 to battery. The X magnet 38 causes the T, R, S, HS, X and XX wipers 39 to 44 inclusive to step forward in the primary direction of the switch. Upon the first step of the switch the X off normal springs are operated in the direction indicated by the arrow so that the circuit for the XD relay through its upper winding is opened but this relay is maintained in operation through its lower winding during the pulsing. The X magnet has no slow release characteristics and hence responds separately to each impulse, but the XD relay has slow releasing characteristics and, therefore, is maintained steadily operated until the complete train of pulses has been transmitted. At the end of this series of pulses the circuit for the X magnet 38 and the XD relay 35 is opened at the armature 3 of the XD relay 35 and at this point the circuit for the YD relay and the Y magnet 45 is prepared.

*Dialing second digit*

When the subscriber dials the second digit the circuit functions in the same manner as hereinbefore described with the exception that the ground controlled by armature 1 of the CB relay 28 is now extended over armature 3 and back contact of the XD relay 35 through armature 2 and front contact of the YD relay 36 to a point where the circuit divides, extending in one direction through the lower winding of the YD relay 36 to battery and in the other direction through the winding of the Y magnet to battery. The Y magnet and the YD relay respond to this second train of pulses in the same manner, that is the Y magnet responds separately to the pulses and the YD relay responds to the pulses as a complete train. Responsive to the Y magnet the T, R, S and HS wipers 39 to 41 respectively move in the secondary direction of the switch, but the secondary and SS wipers 43 and 44 respectively remain in the position to which they were driven during the X movement of the switch. When the switch takes the first step in the secondary direction the secondary off normal set of contacts operates in the direction indicated by the arrow whereby the upper winding of the YD relay 36 is opened so that this relay for its continued operation depends upon the pulsing circuit through its lower winding. At the end of this train of impulses the YD relay releases and the circuit of the Y magnet 45 is opened. The T, R, S and HS wipers of the switch have now been placed on the terminals of the line identified by the two digits which have been dialed. As soon as the terminals of the called line have been reached, and before the YD relay could release, a circuit was established from battery, the armature 1 and back contact of the Z magnet 31, armature 3 and back contact of the BT relay 46 through the upper winding thereof and the middle noninductive winding thereof in parallel to back contact and armature of the Y magnet 45, springs 4 and 5 of the overflow contact set, armature 5 and back contact of the SW relay 34, operated contacts of armature 6 of the YD relay 36, back contact and armature 5 of the SWT relay 30 to the S wiper 41 of the switch, whereby a busy test of the called line may be made. It will be noted shortly here that if the called line is busy then the S wiper 41 will extend this circuit to a ground for the operation of the BT relay 46, whereas if the called line is idle this ground will not be found and the BT relay 46 will fail to operate.

*Busy line*

If the called line had been busy then the BT relay will have operated in the manner just described. Upon operation this relay will be included in a circuit from battery, armature 1 and back contact of the Z magnet 31, the lower non-inductive winding of the BT relay 46 and thence in parallel through the upper winding and the middle non-inductive winding thereof, back contact and armature of the Y magnet 45, springs 4 and 5 of the overflow set, armature 5 and back contact of the SW relay 34 through the back contact and armature 6 of the YD relay 36, as soon as this relay releases, the front contact and armature 4 of the BT relay 46, the front contact and armature 6 of the RD relay 32 to ground, whereby this busy test relay will remain locked in its operated position. The operation of the BT relay thus closes a locking circuit for itself, when the YD relay restores, to a firm ground supplied by the RD relay 32. Busy tone from the BT lead in the shelf supervisory circuit is now extended over the back contact and armature 3 of the YD relay 36, the armature 2 and front contact of the BT relay 46, back contact and armature 3 of the SW relay 34, upper winding of the AB relay 29 through the talking bridge condenser 47, the normal contacts of armature 4 of the AB relay 29, the back contact and armature 3 of the SWT relay 30 to the tip side of the calling line, whereby busy tone is transmitted to the calling subscriber.

*Switch through*

If the called line is idle then the BT relay 46, as hereinbefore described, fails to operate so that upon the release of the YD relay 36 the SW relay 34, after an appropriate interval measured by its slow operating characteristics, will operate. The circuit may be traced from the battery connection found on the sleeve of the calling line over the sleeve wiper 41, the armature 5 and back contact of the SWT relay 30, back contact and armature 5 of the YD relay 36, lower winding of the SW relay 34, back contact and armature 4 of the BT relay 46, front contact and armature 6 of the RD relay 32 to ground. The SW relay responds and locks through its upper winding, its front contact and armature 2 to the master ground wire 33. At its armature 1 and back contact the SW relay opens the circuit between the RA lead in the shelf supervisory circuit and the winding of the Z release magnet 31. At its armature 4 and front contact the SW relay 34 extends a connection from the generator lead in the shelf supervisory circuit through the front contact and armature 4 of the SW relay 34, the lower winding of the RT relay 37, the back contact and armature 7 of the RT relay 37, armature 8 and front contact of the SW relay 34 to the ring wiper 40 of the switch, thence over the network of the called substation including the ringer thereof, the tip wiper 39 of the switch, the front contact and armature 7 of the SW relay 34, the armature 6 and back contact of the RT relay 37 to ground so that the ringer of the called substation is operated. Through its armature 9 and front contact the SW relay 34 places a firm ground on the sleeve wiper 41 of the switch to mark the seized equipment as busy. Through its armature 10 and front contact the SW relay connects the HS wiper 42 of the switch into a connection established by the CB relay 28 and used for purposes with which we are not at present concerned.

*Ringing*

Ringing current is supplied over the circuit hereinabove described. The RT relay 37 does not operate at this time. Ring back tone is supplied from the armature 8 of the SW relay 34, over which the ringing current is being supplied through the condenser 48, the condenser 49, the back contact of armature 5 of the AB relay 29, the back contact and armature 4 of the SWT relay 30 to the ring side of the calling subscriber's line, whereby this calling subscriber is given an indication that ringing current is being applied to the called line.

*Called party answers*

It is conventional to superimpose the ringing current on a direct current source, or otherwise to supply tripping battery, and hence it will be assumed that the current flowing from the generator lead in the shelf supervisory circuit includes a direct current component which now supplies enough current through the circuit of the called substation when the called subscriber thereat has answered to operate the RT relay 37. This relay may be of a conventional two step design having at least one very sensitive armature so that responsive to the answer of the called subscriber the preliminary X contacts thereof, here shown as armature 4 and front contact of the RT relay 37, will operate. This will close a local circuit from the master ground wire 33 to the upper winding of the RT relay 37, whereby the other armatures thereof are operated. Operation of the RT relay 37 through the movement of its armature 1 removes ground from the start wire leading into the common supervisory circuit. Through its armatures 6 and 7 the RT relay disconnects the ringing source from the called line and by the same token disconnects the ringing tone transmitted to the calling line. The circuit is thereupon switched through from the calling to the called line in what may be termed a battery feed connection. That is, the circuit between the calling and called line is separated by the transmission condensers 47 and 49, but talking battery is supplied to the calling line by the windings of the CB relay 28 and talking battery is supplied to the called line through the windings of the AB relay 29. Ground through the front contact and armature 3 of the SW relay 34 is connected through the upper winding to the tip side of the called line connection. Battery is extended through the lower winding of the AB relay 29, thence through the front contact and armature 6 of the SW relay 34 to the ring side of the called line connection. The AB relay responds to the bridge supplied by the called substation circuit. Through its armatures 4 and 5 the AB relay reverses the current flow to the calling substation for conventional purposes. Through its armature 3 and front contact the AB relay 29 supplies an alternate ground from the "W" wiring to the master ground wire 33. As indicated, the "W" wiring may or may not be employed. The results of its employment will be noted hereinafter.

The conversation may now take place.

*Release*

If the "W" wiring is used then the circuit will be converted to one known as "last party release," that is the circuit will be held until both parties release.

*Calling party disconnects first*

When the calling party disconnects the loop over the tip and ring leads to the CB relay 28 is opened and the circuit restores and in turn opens the circuit for the RD relay 32. The RD relay restores and prepares a partial path from the RA lead in the shelf supervisory circuit over its armature 1 and back contact for the operation of the Z magnet, as will be described hereinafter. The RD relay removes the ground from the master ground wire 33, but this is held through the front contact and armature 3 of the AB relay when the "W" wiring is used. A ground is now extended from armature 5 and back contact of the RD relay 32 through the front contact and armature 2 of the AB relay 29 to the upper winding of the XD relay 35. During the release time of the RD relay and the operate time of the XD relay there is an absence of ground on the sleeve wire leading back to the calling substation allowing the preceding equipment to release. However, as soon as the XD relay operates another ground is extended from armature 1 and front contact of the AB relay 29 to armature 1 and front contact of the XD relay 35 to the sleeve extending back to the calling subscriber to mark this switch as busy and therefore unavailable for use at present. The RT relay 37 and the SW relay 34 remain operated from the ground on the master wire 33. When the called party disconnects the loop over the tip and ring leads to the AB relay 29 is opened and this relay releasing removes the ground supplied by the "W" wiring to the master ground wire 33 and thus releases the RT and SW relays and removes the ground from the sleeve lead extending back toward the calling subscriber. The SW relay in restoring removes ground from the sleeve wiper of the switch leading to the called terminal, opens the talking path and the transmission circuit to the AB relay and closes a circuit from the RA lead to the Z release magnet 31. A low resistance ground on the RA lead (not shown) is extended through armature 1 and back contact of the SW relay 34, armature 1 and back contact of the RD relay 32, armature 1 and back contact of the SWT relay 30 through springs 4 and 3 of the X off normal set and in parallel therewith, the springs 4 and 3 of the Y off normal set, the winding of the Z magnet 31 to battery, whereby the Z magnet is operated to release the wipers of the switch and return them to their normal positions. Through its armature 2 and front contact the Z magnet places ground on the sleeve leading toward the calling subscriber to maintain a busy indication for this switch until it is completely released. When the switch returns to normal the X off normal and Y off normal springs restore and open the circuit of the Z release magnet. The Z magnet restores allowing the springs thereof to move back in the normal position and remove ground from the sleeve leading toward the calling line so that this switch now is completely released and available for further service.

*Called party disconnects first*

When the called party disconnects first the loop over the tip and ring leads to the AB relay 29 is opened. The AB relay 29 restores and removes the alternate ground connection to the master ground wire 33 supplied by the "W" wiring if used. The AB relay also reverses battery over the tip and ring leads to the calling line. When the calling party disconnects the loop over the tip and ring leads to the CB relay 28 is opened, the relay restores and opens the circuit for the RD relay 32. The RD relay restores, prepares path of a circuit to the RA lead for operation of the release magnet, opens the master ground circuit and removes ground from the back sleeve, allowing the preceding switches to release. The XD relay 35 does not operate at this time due to the fact that the AB relay has opened the circuit heretofore described. The RT relay, depending on the master ground over wire 33, restores and likewise the SW relay restores, thus placing the switch in condition for complete release which takes place as above described.

If the "W" wiring is not used, the circuit will release when the calling party hangs up.

*Switch through on marked level*

When this circuit is seized by the preceding equipment the circuit functions as described hereinbefore. When the XD relay 35 restores after the dialing of the desired first digit, a marking ground will cause the operation of the RT and BT relays. The ground is indicated in the right hand portion of Fig. 5 marked "M" wiring. Wherever a particular level of the switch is to be used for extending connections to trunk lines leading to a central office or where, for any other purpose, the switch is to be converted to selector operation, then the corresponding terminal of the bank of terminals traversed by the X wiper 43 will be grounded as indicated. Assuming that a marked level has been reached, then this ground will be extended over the X wiper 43, armature 2 and back contact of the XD relay 35 upon the release of this relay, armature 1 and front contact of the YD relay 36, armature 2 and back contact of the RT relay 37 and thence through the upper winding of the relay to battery. The RT relay first operates its armature 4 and front contact to lock this relay into the master ground wire 33 and thereafter operates the rest of its contacts. Operation of the RT relay 37 at its armature 1 and back contact removes ground from the start lead and closes a circuit for the SWT relay 30 which will become effective as hereinafter described. The BT relay will start to operate from the marking ground over the X wiper 43, the armature 2 and back contact of the XD relay 35, the armature 1 and front contact of the YD relay 36, the back contact and armature 2 of the RT relay 37, the springs 7 and 6 of the Y off normal set, the armature and back contact of the Y magnet 45 to the winding of the BT relay 46 and thence through a circuit hereinbefore described. However, the armature 4 of the RT relay 37 is fast operating and will extend the master ground 33 to the BT relay 46 to insure the operation of this latter relay even after the original circuit above described has been opened at the back contact of armature 2 of the RT relay 37. The BT relay operates in this circuit and closes a circuit for the YD relay 36 and the Y magnet in parallel. This circuit may be traced from ground, armature 6 and front contact of the RD relay 32, armature 4 and front contact of the BT relay 46, armature 4 and front contact of the YD relay 36, front contact and armature 3 of the RT relay 37, armature 3 and back contact of the XD relay 35, armature 2 and front contact of the YD relay 36 to the point where the circuit divides, going in one direction through the lower winding of the YD relay 36 and in the other direction through the winding of the magnet 45. The YD relay is held operated through its lower winding and through virtue of its slow releasing characteristic during the following automatic operation. The Y magnet operates over the above path stepping the switch one step in the Y direction and by means of the Y off normal contacts opens the original operating circuit of the YD relay 36 and the original operating circuit of the BT relay 46. The BT relay restores and, in turn, opens the operating circuit of the YD relay and the Y magnet, but the YD relay remains operated during pulsing because of its slow releasing characteristics. The Y magnet restores and connects the BT relay to the forward sleeve wiper 41. If the first line is busy, ground on the sleeve bank is forwarded over the associated wiper through armature 5 and back contact of the SWT relay 30, operated contacts of armature 6 of the YD relay 36, armature 5 and front contact of the RT relay 37 to maintain a ground on the right hand terminal of the SWT relay 30 to maintain this relay short circuited and to prevent its operation until an idle line has been encountered. The BT relay 46 reoperates and recloses the circuit for the operation of the YD relay 36 and the Y magnet 45. The circuit continues to function as above described and the alternate operation of the BT relay 46 and the Y magnet 45 continues until an idle line is found or until the switch steps to the overflow position, where the overflow contacts shown in the upper left hand portion of Fig. 4 are operated. Absence of ground on the sleeve bank indicating an idle line will prevent the BT relay 46 from operating, thus extending battery through normal contacts of the Z magnet 31, the BT relay in its unoperated position, the back contact and armature of the Y magnet 45, the contacts 4 and 5 of the overflow set of contacts, armature 5 and back contact of the SW relay 34, armature 5 and front contact of the RT relay 37, the winding of the SWT relay 30 to ground on the sleeve lead leading to the calling substation. The SWT relay 30 and the BT relay 46 are thus placed in series, but the BT relay, being of comparatively much lower resistance than the SWT relay, will not be able to derive sufficient current for its operation; hence the SWT relay 30 will operate whereas the BT relay 46 in series therewith will remain unoperated. The SWT relay 30 operates and closes the tip and ring leads of the preceding equipment through to the tip and ring wipers 39 and 40 in a clear metallic circuit. The circuit of the CB relay 28 is opened and this relay releases. The SWT relay through its armature 2 and front contact provides a circuit for itself in series with the BT relay independent of the circuit through armature 5 and front contact of the RT relay 37. Through its armature 5 and front contact the SWT relay extends ground on the sleeve lead of preceding equipment through to the brush of the forward sleeve wiper 41. The CB relay 28 restores and opens the circuit of the RD relay 32. The RD relay restores and removes ground from the SWT relay, placing this relay under control of ground extended from the sleeve lead in following equipment, such as the two-way trunk 15 or 16, and opens the master ground wire 33, thus releasing the RT relay 37. The RT relay restores and opens the original battery circuit to the SWT relay 30 thus placing the SWT relay under control of its own front contact and armature 2. When the calling party releases, ground is removed from the controlling equipment which will cause the SWT relay 30 to release. The SWT relay restores and closes a circuit from the RA lead in the shelf supervisory circuit to the Z release magnet, as hereinbefore described. A low resistance ground on the RA lead forwarded through normal contacts of the SW relay 34, the RD relay 32 and the SWT relay 30 through the operated X off normal and Y off normal contacts is extended to the Z magnet as hereinbefore described to cause the magnet to operate and release the switch to its normal position.

*Restricted service wiring*

The restricted service wiring is noted as the "N" wiring and consists in a connection from the HS incoming wire of the switch to any one or more of the contacts traversed by the XX wiper 44. After the XD relay 35 restores at the end of the first train of dial pulses, if this "N" wiring is used and the XX wiper 44 is resting on a terminal thus marked, a circuit will be established from ground in the line circuit Fig. 3 providing the terminal 27 of that line circuit is grounded, over the HS lead, the marked terminal of the XX wiper 44, thence over the strap 50 used when the "N" wiring is used, armature 4 and back contact of the XD relay 35, back contact and armature 5 of the SWT relay 30 to the forward sleeve wiper 41, thus placing an artificial busy indication on this sleeve wiper whereby no idle trunk or line may be detected. The ground armature 4 of the XD relay 35 will also be extended over the front contacts of armature 6 of the YD relay 36, the back contact and armature 5 of the SW relay 34, springs 5 and 4 of the overflow set, springs 6 and 7 of the Y off normal set to the winding of the RT relay 37 which thereupon operates so that the switch will again be caused to operate automatically to the overflow position so that service will be denied to the calling subscriber thus marked for restricted service.

Thus it will be noted that after the end of the first train of pulses when the XX wiper 44 comes to rest on any terminal marked for restricted service, the switch will be stepped automatically to its overflow position regardless of any marking or absence of marking for the corresponding X wiper 43. If the X wiper 43 encounters a marked terminal but the XX wiper does not encounter a correspondingly marked terminal, then the switch will automatically step to the first idle line. Hence it will be clear that a restricted line may be given access to either individual lines or to trunks in levels where the XX wiper 44 does not encounter a marked terminal and may be denied service to either individual lines or to trunks in all levels where the XX wiper encounters marked terminals. By way of example, if a restricted subscriber's line drives the switch to either the level 6 or 9, the switch will automatically move to the overflow position, but if moved to the 0 level will automatically move to seek an idle trunk. If a nonrestricted line drives the switch to either level 9 or 0 the automatic movement as a selector will take place, but on any other level the switch will act as a connector.

*Busy tone on overflow*

When the switch steps through to the overflow position, the BT relay 46 does not operate. A busy tone is extended over the BT lead from the shelf supervisory circuit, the back contact and armature 3 of the YD relay 36, springs 1 and 2 of the overflow set, back contact and armature 3 of the SW relay 34, through the upper winding of the AB relay 29, through the bridge condenser 47 to the calling line to notify the subscriber thereat that he has encountered a busy line, or, in other words, that no connection can be made to this called line.

What is claimed is:

1. In a telecommunication system, a plurality of subscriber lines each including a station and a line circuit, a selector-connector for extending said lines to selected terminals of any one of a plurality of outgoing lines, the plurality of terminals of said outgoing lines being grouped, first means for marking selected ones of said groups of outgoing line terminals in one manner to identify said groups as connecting to outgoing trunk lines, second means for additionally marking selected ones of said first marked groups to identify the additionally marked groups of outgoing terminals as connecting to outgoing lines designated to be restricted from connection with a certain class of subscriber line, a relay in the circuit of said selector-connector responsive to a given operation of a selected line connected to one of said unmarked group terminals, said relay being operated in response to said first marking means, and means responsive to the operation of said relay by said first marking means for converting the circuit of said selector-connector from one suitable for extending a connection from one of said subscriber lines to any desired line connected to outgoing terminals in an unmarked group of outgoing line terminals to one suitable for extending a connection to outgoing terminals of any lines in a group of outgoing terminals marked by said first marking means only.

2. In a telecommunication system, a plurality of subscriber lines each including a station and a line circuit, a selector-connector for extending said lines to selected terminals of any one of a plurality of outgoing lines, the plurality of terminals of said outgoing lines being grouped, means for marking selected ones of said groups of outgoing line terminals in a manner to identify said groups as connecting to outgoing trunk lines, a circuit arrangement for said selector-connector including a relay responsive to a given operation of a selected line connected to one of said unmarked group terminals, said relay being also operated in response to said marking means, means in said circuit arrangement for establishing a divided battery feed talking path through said selector-connector, means for establishing a clear metallic path through said selector-connector, and means responsive to the operation of said relay by said marking means for controlling the operation of said last-named means to establish the clear metallic path through the selector-connector.

3. In a telecommunication system, a plurality of subscriber lines each including a station and a line circuit, means for marking any one or more of said lines for restricted service, a selector-connector switch for extending said lines, a circuit arrangement for said switch including means to operate said switch as a connector and means to convert the said circuit to operate said switch as a selector, said switch having terminals arranged in groups, means for marking said groups for selector operation and other means for marking said groups for restricted service, said switch circuit including a relay for testing for the idle or busy condition of a selected line, said relay being responsive to said first group marking means for additionally controlling said selector operation, a second relay for detecting the answer of a subscriber on a called line connected to a terminal in one of said unmarked groups, said second relay being responsive to said first group marking means for converting said switch circuit from connector to selector operation, and means jointly responsive to said second group marking means and said subscriber line marking means to place an artificial busy condition on said switch circuit to prevent the detection of said first relay of an idle selected line.

4. In a telecommunication system, a plurality of subscriber stations, a line circuit for each of said subscriber stations, means for marking any one or more of said line circuits for restricted service, a selective switch, said switch having groups of outgoing line terminals, means for connecting any one of said line circuits to said switch, said switch having a set of brushes movable in a first direction to select a group of outgoing line terminals and in a second direction to select terminals of individual outgoing lines, said switch having an auxiliary brush for movement in a first direction only as said set of brushes is moved in the first direction, a set of auxiliary brush terminals for said auxiliary brush positioned for each auxiliary terminal to be individually and successively contacted by said auxiliary brush as said switch is moved in the first direction to positions with said set of brushes contacting individual and successive groups of line terminals, means for marking selected ones of said auxiliary brush terminals, and means connecting said auxiliary brush to the marking means for any one of the marked line circuits to establish a circuit from a marked one of said subscriber station lines over a said marked auxiliary brush terminal for preventing the establishment of a connection from a marked line circuit to any outgoing line in the group of outgoing line terminals selected by a first movement of the switch to a position with the auxiliary brush in contact with a said marked auxiliary brush terminal.

5. In a telecommunication system, a plurality of subscriber stations, a line circuit for each of said subscriber stations, means for marking any one or more of said line circuits for restricted service, a selective switch, said switch having groups of outgoing line terminals, means for connecting any one of said line circuits to said switch, said switch having a set of brushes movable in a first direction to select a group of outgoing line terminals and in a second direction to select terminals of individual outgoing lines, said switch having a first auxiliary brush for movement in a first direction only as said set of brushes is moved in the first direction, a set of first auxiliary brush terminals for said first auxiliary brush positioned for each auxiliary terminal to be individually and successively contacted by said first auxiliary brush as said switch is moved in the first direction to positions with said set of brushes contacting individual and successive groups of line terminals, said switch having a second auxiliary brush for movement in a first direction only simultaneously with the movement of said first auxiliary brush, a set of second auxiliary brush terminals for said second auxiliary brush positioned for each auxiliary terminal to be individually and successively contacted by said second auxiliary brush as said switch is moved in the first direction to positions with said set of brushes contacting individual and successive groups of line terminals, means for marking selected ones of said first auxiliary brush terminals, means connecting said first auxiliary brush to the marking means for any one of the marked line circuits to establish a circuit from a marked one of said subscriber station lines over a said marked first auxiliary brush terminal for preventing the establishment of a connection from a marked line circuit to any outgoing line in the group of outgoing line terminals selected by a first movement of the switch to a position with the first auxiliary brush in contact with a said marked first auxiliary brush terminal, means for marking selected ones of said second auxiliary brush terminals, and means connecting said second auxiliary brush to said selective switch to cause said switch to operate automatically in the second direction when said second auxiliary brush is contacting a marked second auxiliary brush terminal upon completion of the movement of the switch in the first direction.

GEORGE ELLIOTT.

References Cited in the file of this patent

UNITED STATES PATENTS

| Number | Name | Date |
|---|---|---|
| 1,424,644 | Herink | Aug. 1, 1922 |
| 1,468,078 | Ray et al. | Sept. 18, 1923 |
| 1,492,995 | Lubberger | May 6, 1924 |
| 2,005,595 | Roome et al. | June 18, 1935 |
| 2,258,651 | Hovland | Oct. 14, 1941 |